United States Patent
Olgun et al.

(10) Patent No.: US 12,166,274 B2
(45) Date of Patent: Dec. 10, 2024

(54) CELLULAR ANTENNA ARCHITECTURES FOR AR CAPABLE WEARABLE DEVICES

(71) Applicant: Snap Inc., Santa Monica, CA (US)

(72) Inventors: Ugur Olgun, Marina Del Rey, CA (US); Jason Heger, Louisville, CO (US); Praveen Babu Vadivelu, Broomfield, CO (US); Jordan Wakser, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 69 days.

(21) Appl. No.: 17/820,719

(22) Filed: Aug. 18, 2022

(65) Prior Publication Data

US 2024/0063530 A1      Feb. 22, 2024

(51) Int. Cl.
*H01Q 1/27*       (2006.01)
*H01Q 1/24*       (2006.01)
*H01Q 7/00*       (2006.01)

(52) U.S. Cl.
CPC .............. *H01Q 1/273* (2013.01); *H01Q 1/24* (2013.01); *H01Q 1/241* (2013.01); *H01Q 7/00* (2013.01)

(58) Field of Classification Search
CPC .......... H01Q 1/273; H01Q 1/24; H01Q 1/241; H01Q 7/00; H01Q 9/42
See application file for complete search history.

(56) References Cited

U.S. PATENT DOCUMENTS

| | | |
|---|---|---|
| 11,415,818 B2 | 8/2022 | Olgun et al. |
| 2016/0204839 A1 | 7/2016 | Liu et al. |
| 2019/0033622 A1 * | 1/2019 | Olgun ...................... H04B 5/24 |
| 2021/0399405 A1 | 12/2021 | Hintermann et al. |

FOREIGN PATENT DOCUMENTS

| | | | | |
|---|---|---|---|---|
| CN | 110635223 A | * | 12/2019 | ............... H01Q 1/27 |
| KR | 20220048336 A | * | 4/2022 | ............... H01Q 1/27 |
| WO | WO-2018165201 A1 | * | 9/2018 | ............. G02C 11/10 |
| WO | 2022055690 | | 3/2022 | |

OTHER PUBLICATIONS

"International Application Serial No. PCT US2023 030235, International Search Report mailed Dec. 6, 2023", 3 pgs.
"International Application Serial No. PCT US2023 030235, Written Opinion mailed Dec. 6, 2023", 7 pgs.

* cited by examiner

*Primary Examiner* — Hoang V Nguyen
(74) *Attorney, Agent, or Firm* — Schwegman Lundberg & Woessner, P.A.

(57) ABSTRACT

Examples include a wearable device having a frame, a temple and onboard electronics components. The frame can optionally configured to hold one or more optical elements. T temple can optionally connected to the frame at a joint such that the temple is disposable between a collapsed condition and a wearable condition in which the wearable device is wearable by a user to hold the one or more optical elements within user view. The onboard electronics components can be carried by at least one of the frame and the temple and can include a first antenna configured for cellular communication carried by the frame and a second antenna configured for cellular communication carried by one of the frame or the temple.

17 Claims, 16 Drawing Sheets

CELLULAR ANTENNA ARCHITECTURES FOR AR CAPABLE WEARABLE DEVICES

BACKGROUND

Integrating cellular technology in a modern consumer electronics device is a complicated engineering problem. With a cellular enabled device, core RF technology is complex, and regulatory compliance and certification requirements are elevated since these devices operate on licensed and rigidly monitored spectrum. Specifically, on the antenna side, the modern cellular communication standards necessitate an antenna architecture with multiple elements, each of which has to be electrically isolated from one another to ensure little to no correlation between the different antenna elements. These antenna elements should be capable of simultaneous operation with high radiation efficiency on wide and far apart frequency bands. Given the desire to maximize cellular coverage by the carrier networks, some of these frequency bands are located where the wavelengths are considerably larger than a typical modern smartphone itself. Essentially, a core engineering challenge in incorporating cellular technology into a consumer electronics device is the ability to design multiple electrically small antennas that are highly efficient and electrically isolated from each other.

Modern smartphones and tablets solve these problems by dedicating a large volume for multiple antennas that will be located on the opposite ends of the device. Such handheld devices also lean very heavily on active tuning methods. However, wearable devices have much more stringent space, weight and battery requirements compared to larger devices such as modern smartphones and tablets.

BRIEF DESCRIPTION OF THE DRAWINGS

The appended drawings merely illustrate a selection of example embodiments of the present disclosure and cannot be considered as limiting its scope. To facilitate collation of numbered items in the description to the drawings, the first digit of each numbered item corresponds to the figure in which that item first appears. In the drawings.

DETAILED DESCRIPTION

Figure 1:
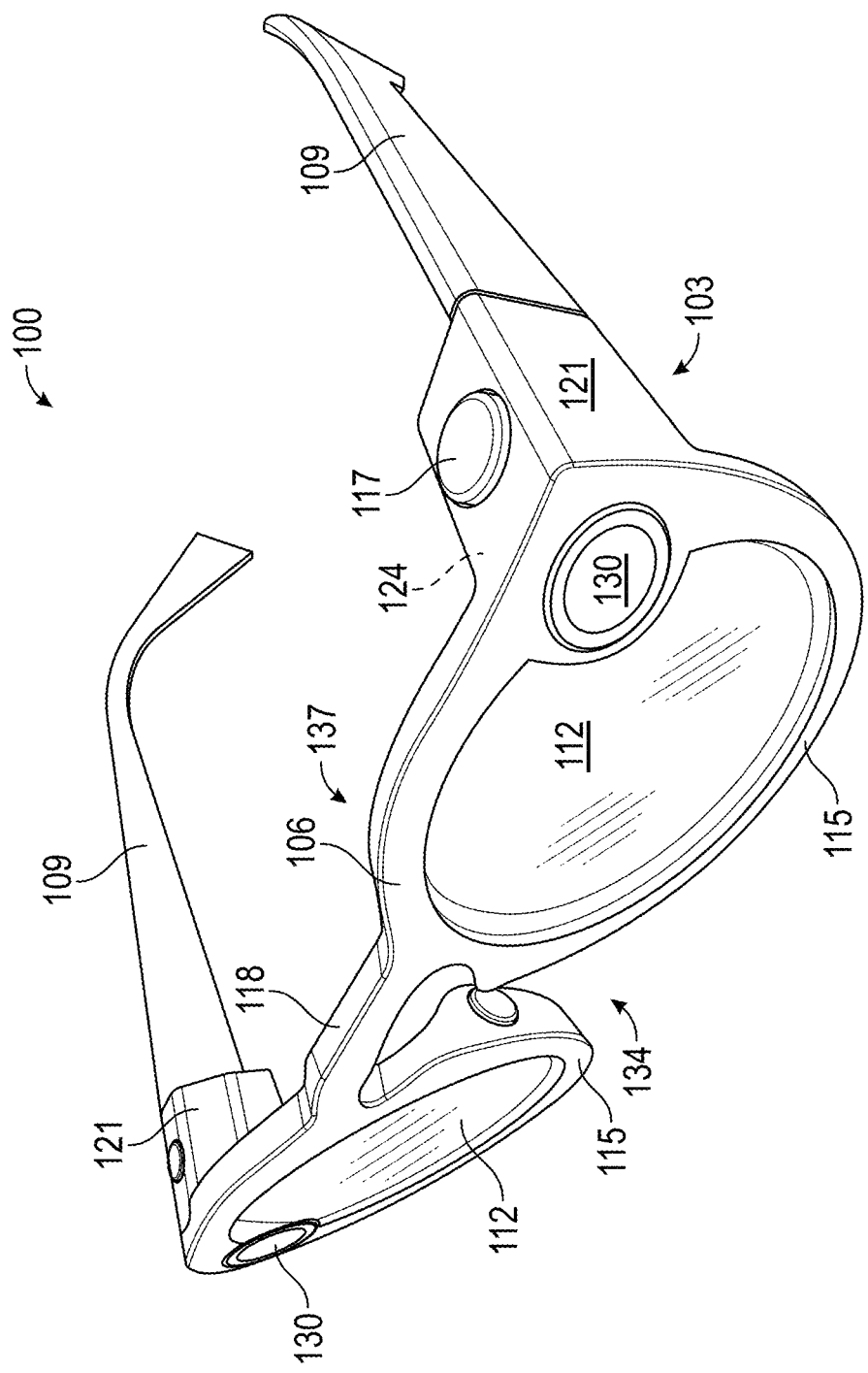
FIG. 1 is a perspective view of an electronics-enabled eyewear device, according to an example embodiment.

The subject matter disclosed herein generally relates to eyewear, and more specifically to electronics-enabled eyewear with cellular communication enabling onboard electronic components such as a plurality of antennas and a cellular transceiver. Thus, the eyewear can include an antenna system. Such antenna system can be carried by the frame, the temple(s), or a combination of the temple(s) and the frame, for example. Contemplated antenna systems can include two or more loop antennas, two or more non-loop antennas (e.g., monopole or dipole antennas) and/or a combination of loop antenna(s) and non-loop antenna(s). According to one example, the antenna systems disclosed can include a common transceiver configured for cellular communication and the antennas are connected to the transceiver and configured to receive (and one or more can transmit) a common cellular signal.

The present application discloses the loop antenna comprises a loop-shaped electrical conductor. Various non-loop antenna structures (sometimes referred to as electric type or E-type antenna) are also contemplated including a loaded monopole conductor (e.g., inverted F antenna, inverted L antenna, etc.), a dipole conductor, or the like. As used herein, the term non-loop conductor/antenna (sometimes called an incomplete loop antenna herein) refers to dipole conductors/antennas and/or monopole conductor/antennas, and excludes loop antenna/conductors. Further, the disclosed antenna elements provided by the respective loop and non-loop conductors are to be understood as providing actively driven antenna elements, which are to be distinguished from passive groundplane elements such as that which is in some cases provided by printed circuit board (PCB) groundplanes or extensions thereof.

The antenna system may further include electronics configured to provide frequency-domain discrimination. However, it is contemplated that the loop antenna(s) and/or the non-loop antenna(s) disclosed can be configured (e.g., sized and shaped) for cellular communication (operation). Thus, the antennas can be configured to receive and/or transmit data at approved frequency ranges for 3G, 4G, 5G, 6G, etc. communication (generally between 699 MHz to 2200 MHz range), and can be configured to cover even wider frequencies if desired. Specific cellular bands supported can include n12, n13, n5, n8, n1, n2, n3, n66, etc.

It will be understood that the antenna systems disclosed herein provide improved cellular signal reception, improved radiation efficiency, improved polarization diversity, and other benefits when compared to existing antenna systems for handheld or wearable devices.

Cellular enabled hand held devices (mobile phones, tablets, etc.) and other cellular enabled devices such as drones, home internet equipment, hotspots, etc. do not face space and radiation concerns of wearable devices. Smart watches, although cellular enabled, generally process little cellular data. AR capable wearable devices such as the electronics-enabled eyewear (sometimes referred to as smart glasses, eyewear device or simply eyewear herein) disclosed herein with cellular functionality is a new concept. These devices are expected to process cellular data that are comparable to a modern smartphone as these device can be downloading lenses, information about the current environment, and uploading data to the cloud for processing. This implies that the antenna architecture has to be capable of very high radiation performance with respect to efficiency and isolation, and do all this when worn on a user's head. However, the current construction of AR devices does not allow following the best practices such as isolation and tuning. AR capable wearable devices are first of all worn devices like smart watches, not rectangular boxes like smartphones, meaning that the appearance, weight and thermal performance are critical parameters. On a mobile phone, the circuit board can be hidden behind the display. This is not possible for smart glasses as the display is see-through. As a result of the display arrangement of smart glasses, the circuit boards have to reside in other areas such as on the temples, which reduces the size that is available to them, which further reduces the volume that could be made available to a single antenna element, let alone multiple of them. Weight and thermal performance requirements typically limit the size of the battery on these devices, which have a direct impact on available computing power left for using advanced antenna tuners. In addition, the human head is composed of brain tissue, which is long known for absorbing RF signals in the microwave frequency range, where cellular systems operate. Current systems that account for proximity to the head and also address the other design criteria discussed herein are only in early development.

Various embodiments of an antenna system according to this disclosure will be described below with reference to an electronic device in the example form of an eyewear device that incorporates the disclosed antenna system. Such eyewear device may include one or more cameras, indicator lights, memory, control circuitry, battery elements, and wireless communication circuitry among other components.

An example embodiment of such an eyewear device in which different embodiments of the antenna system can be incorporated will first be described with reference to FIG. 1, after which a series of different example embodiments of antenna systems and eyewear devices incorporating the different respective embodiments will be described with reference to FIGS. 2A-16.

FIG. 1 shows an oblique front view of an electronic device in the example form of an electronics-enabled eyewear device 100, also referred to as a pair of smart glasses. The eyewear device 100 includes a body 103 comprising a front piece or frame 106 and a pair of temples 109 moveably connected to the frame 106 for supporting the frame 106 in position on a user's face when the eyewear device 100 is worn. The frame 106 can be made from any suitable material such as plastics, composite, or metal, including any suitable shape memory alloy.

The eyewear device 100 has a pair of optical elements in the example form of a pair of optical lenses 112 held by corresponding optical element holders or lens holders in the form of a pair of lens rims 115 forming part of the frame 106. The rims 115 are connected by a bridge 118. In other embodiments, of one or both of the optical elements can be a display, a display assembly, or a lens and display combination. The eyewear device 100 can, in such embodiments, provide a virtual reality headset or an augmented reality display.

The frame 106 includes a pair of end pieces 121 defining lateral end portions of the frame 106. In this example, a variety of electronics components are housed in one or both of the end pieces 121, as discussed in more detail below. In some embodiments, the frame 106 can be formed of a single piece of material, so as to have a unitary or monolithic construction.

The temples 109 are coupled to the respective end pieces 121. In this example, the temples 109 are coupled to the frame 106 by respective hinges (articulating joint) so as to be hingedly movable between a wearable mode (as shown in FIG. 1) and a collapsed mode in which the temples 109 are pivoted towards the frame 106 to lie substantially flat against it. In other embodiments, the temples 109 can be coupled to the frame 106 by any suitable means. Each of the temples 109 includes a front portion that is coupled to the frame 106 and a suitable rear portion for coupling to the ear of the user, such as the curved earpiece illustrated in the example embodiment of FIG. 1.

In this description, directional terms such as front, back, forwards, rearwards, outwards and inwards are to be understood with reference to a direction of view of a user when the eyewear device 100 is worn. Thus, the frame 106 has an outwardly directed front side 134 facing away from the user when worn, and an opposite inwardly directed rear side 137 side facing towards the user when the eyewear device 100 is worn. Similarly, the terms horizontal and vertical as used in this description with reference to different features of the eyewear device 100 are to be understood as corresponding to the orientation of the eyewear device 100 when it is level on the face of a user looking forwards. A horizontal or lateral direction of the eyewear device 100 thus extends more or less between the end pieces 121, while a vertical or upright direction of the eyewear device 100 extends transversely to the horizontal direction, such that the lenses 112 can be said to have a more or less vertical or upright orientation.

The eyewear device 100 has onboard electronic components 124 (sometimes called just electronics or components herein) including any one or combination of an antenna system (discussed further subsequently), a camera, a microphone, a speaker, a battery, a display device, a computing device, such as a computer, which can, in different embodiments, be of any suitable type so as to be carried by the body 103. In some embodiments, various components comprising the onboard electronics 124 are at least partially housed in one or both of the temples 109. In the present embodiment, various components of the onboard electronics 124 are housed in the lateral end pieces 121 of the frame 106. As discussed above, the onboard electronics 124 includes one or more processors with memory, wireless communication circuitry, and a power source (this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways. At least some of electronics components of the antenna systems described herein may be housed in one or both of the end pieces 121. Thus, for example, certain electronics components such as the cellular transceiver may in some embodiments be housed in one of the end pieces 121 rather than in the temple 109 as further discussed and illustrated subsequently.

As mentioned, the onboard electronics 124 includes a rechargeable battery. In some embodiments, the battery is disposed in one of the temples 109. In this example embodiment, however, the battery is housed in one of the end pieces 121, being electrically coupled to the remainder of the onboard electronics 124.

The eyewear device 100 is camera-enabled, in this example comprising a camera 130 mounted in one of the end pieces 121 and facing forwards so as to be aligned more or less with the direction of view of a wearer of the eyewear device 100. The camera 130 is configured to capture digital still as well as digital video content. Operation of the camera 130 is controlled by a camera controller provided by the onboard electronics 124, image data representative of images or video captured by the camera 130 being temporarily stored on a memory forming part of the onboard electronics 124. In some embodiments, the eyewear device 100 can have a pair of cameras 130, e.g. housed by the respective end pieces 121.

The eyewear device 100 further includes one or more input and output devices permitting communication with and control of the camera 130. In particular, the eyewear device 100 includes one or more input mechanisms for enabling user control of one or more functions of the eyewear device 100. In this embodiment, the input mechanism comprises a button 117 mounted on the frame 106 so as to be accessible on top of one of the end pieces 121 for pressing by the user.

The eyewear device 100 is, in this example embodiment, configured for wireless communication with external electronic components or devices, to which end the onboard electronics 124 is connected to an antenna system integrated in the body 103 of the eyewear device 100.

Figure 2A:
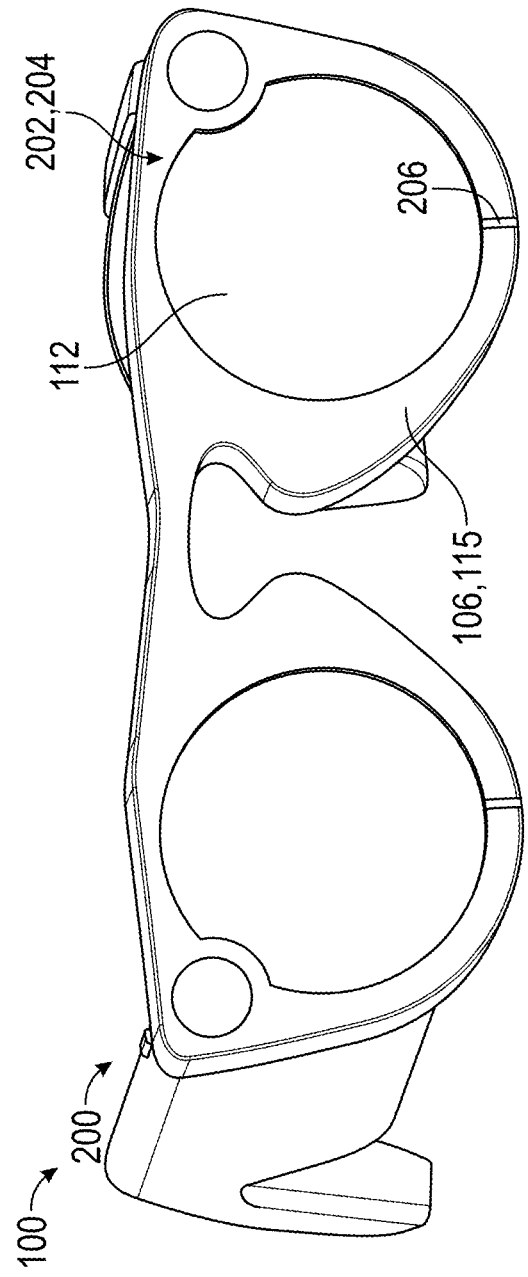
FIG. 2A is second a perspective view of the eyewear device of FIG. 1 having an antenna system including a first antenna carried by the frame, according to an example embodiment.
Figure 2B:
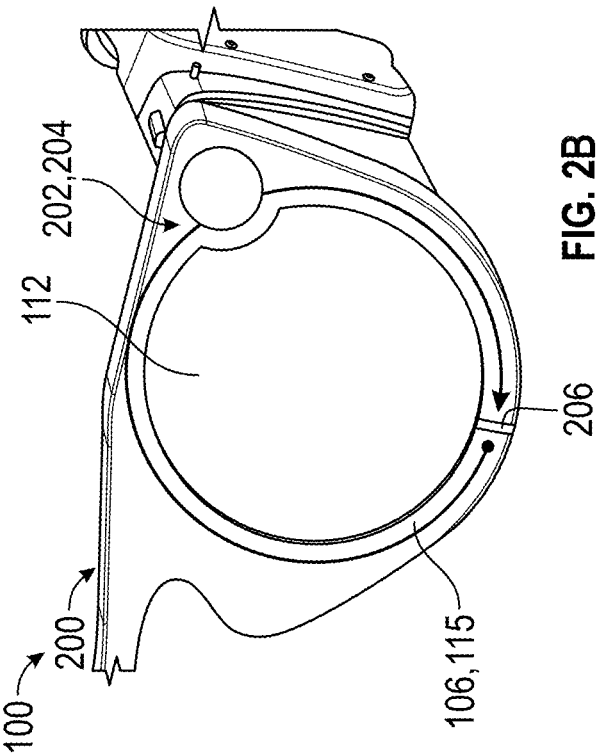
FIG. 2B is an enlarged view of a portion of the frame of FIG. 2A showing a current path for the first antenna around a lens carried by the frame, according to an example embodiment.

Turning to FIGS. 2A and 2B, the eyewear device 100 can be equipped with an antenna system 200 that includes a first antenna 202. The first antenna 202 can be configured as a loop conductor 204. This loop conductor 204 can form a part of the antenna system 200. According to the example of FIGS. 2A and 2B, the loop conductor 204 is provided by the lens rim 115, for example. More particularly, the lens rim 115 can be part of the frame 106 and can be constructed of a metal, metal alloy or other suitable electrically conductive material so as to be operable as the first antenna 202. The lens rim 115 and first antenna 202 can act as a lens retainer for retaining the lens 112. Note that, in FIGS. 2A and 2B, only one of the lens rims 115 is shown as having a corresponding first antenna 202/loop conductor 204 housed therein. However, further embodiments contemplate that portions of both of the lens rims 115 be utilized as antennas/conductors as further discussed herein.

In the embodiment of FIGS. 2A and 2B, the first antenna 202 is constructed from the frame 106 itself. However, further embodiments disclosed herein contemplate the frame 106 being constructed from an electrically non-conductive or semi-conductive material(s) such as rigid plastics and the first antenna 202 can be a separate component coupled to the frame 106 by embedding, insert molding or other known technique.

The first antenna 202, as part of the lens rim 115, can be located in a circumferentially extending around a portion such as a majority of the periphery of the lens 112. The lens rim 115 and antenna 202 is engageable with the radially outer edge of the lens 112. This construction retains the lens 112.

The eyewear 100 including lens 112 can have a construction as described variously in U.S. Pat. No. 9,726,904, titled EYEWEAR WITH CONDUCTIVE TEMPLE JOINT (filing date, Sep. 29, 2015); U.S. Pat. No. 9,482,882 titled EYEWEAR HAVING SELECTIVELY EXPOSABLE FEATURE (filed Apr. 15, 2015); and U.S. Pat. No. 9,482,883 titled EYEWEAR HAVING LINKAGE ASSEMBLY BETWEEN A TEMPLE AND A FRAME filed (Apr. 15, 2015), U.S. Pat. No. 10,877,293, titled EYEWEAR DEVICE LENS RETENTION MECHANISM, (filed Jan. 18, 2018), U.S. Pat. No. 11,063,338, titled HYBRID ANTENNA SYSTEM FOR WEARABLE DEVICES, (filed Jan. 24, 2019), U.S. Pat. No. 10,534,203, titled NEAR-FIELD ANTENNA FOR EYEWEAR, (filed Jul. 31, 2017), the contents of all of which are incorporated herein in their entirety.

According to one example, the lens 112 can be constructed of a chemically-strengthened lithium aluminosilicate (LAS) glass. Example properties of such glass are shown in TABLE 1 below:

TABLE 1

| Electrical Properties (extrapolated) | | |
|---|---|---|
| Frequency $f_0$ [MHz] | Dielectric constant ε | Toss of tangent tan δ |
| 54 | 7.3 | 0.007 |
| 480 | 7.1 | 0.008 |
| 825 | 7.1 | 0.009 |
| 912 | 7.1 | 0.009 |
| 1977 | 7.0 | 0.010 |
| 2170 | 7.0 | 0.010 |
| 2986 | 7.0 | 0.011 |

The disclosed first antenna 202 of the eyewear 100 can benefit from the fact that the lens 112 can be optically efficient. The chemistry of these optically transparent, extremely low loss material when used for lens 112 implies that the construction of the lens 112 also has an extremely low energy loss at RF microwave frequency bands where cellular systems operate. As such, the lens 112 as contemplated herein can make for perfect antenna substrate when coupled to the first antenna 202 (and other antenna constructs discussed herein). Thus, it is advantageous to place the first antenna 202 around the lens 112 and couple the first antenna 202 to the lens 112.

Due to the advantageous properties of the lens 112, it is further contemplated that the first antenna 202 could be constructed within the lens 112 of the eyewear 100 rather than, or in addition to being constructed (or housed) in the frame 106. As shown best in FIG. 2B, the first antenna 202 is formed by the frame 106 and is configured to form a loop for a current path (indicated with arrow) around substantially an entirety of the lens 112. As shown in FIG. 2B, the current path can be generated (excited) at or adjacent a gap 206 in the frame 106 filled by an electrically insulative material (e.g., plastic, etc.). The current path can terminate at or adjacent another side of the frame 106 from the gap 206.

Thus, the example of FIGS. 2A and 2B show an arrangement where the loop conductor 204 can extend circumferentially around one of a pair of lenses 112 (or, in some embodiments, other optical elements such as virtual reality or augmented reality display elements) held by the eyewear 100. One or more of the lenses 112 can be retained by the loop conductor 204/first antenna 202 that is part of the antenna system 200. More particularly, by engaging a radially outer periphery of the associated lens 112, the loop conductor 204/first antenna 202 can keep the lens 112 in position relative to the frame 106.

An advantage of placing the first antenna 202 coupled to, within or immediately adjacent the lens 112 is that the antenna design leverages the eye cavity of the user when the eyewear 100 is worn. The eye cavities form a natural separation between the frame 106 of the eyewear 100 and brain tissue in the head, which has significant RF energy absorption properties. This separation helps immensely with the radiation efficiency of the antennas as they have an opportunity to radiate outside the body of the user instead of radiating within the brain tissue.

Figure 3A:
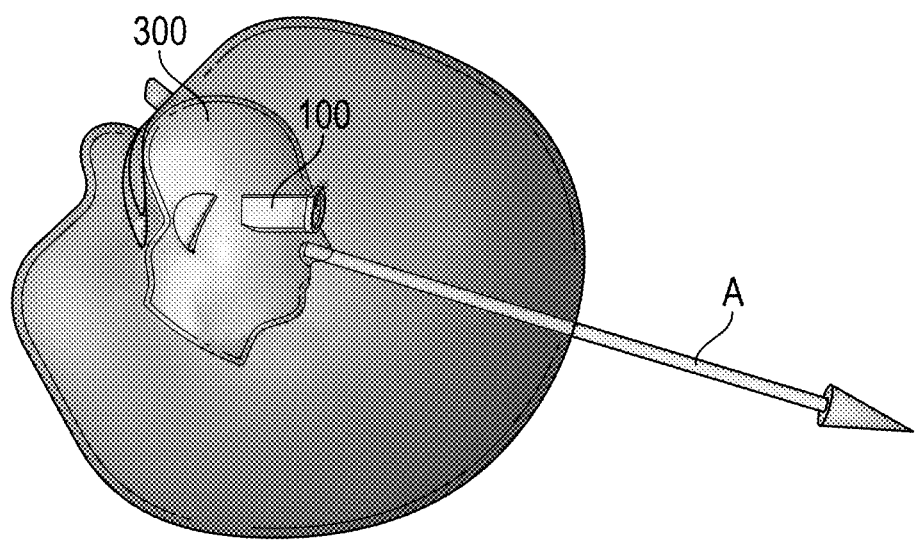
FIGS. 3A and 3B illustrate radiation patterns of the first antenna carried by the frame, according to an example of the present application.
Figure 3B:
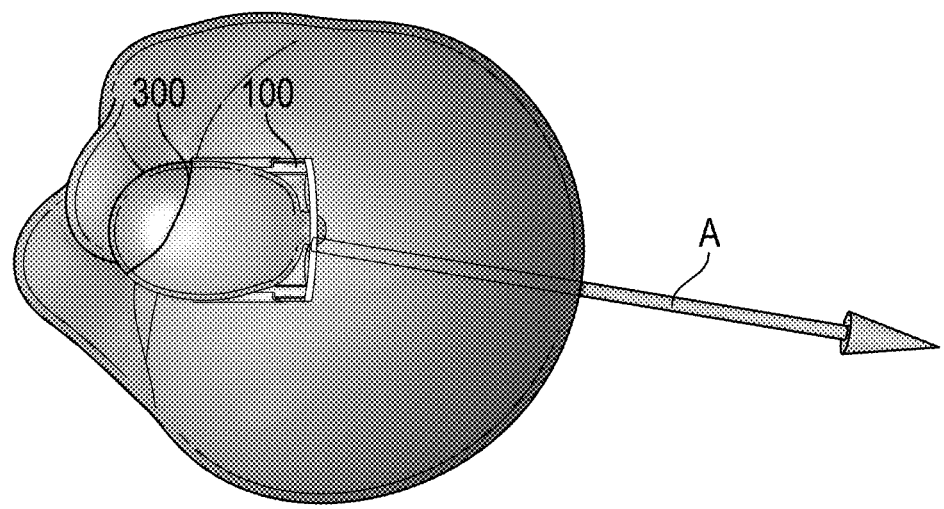

FIGS. 3A and 3B illustrate radiation patterns associated with operation of the first antenna 202 (FIGS. 2A and 2B). As shown, the construction of the first antenna 202 forms a beam that radiates away from a face of the user 300. Peak radiation (indicated with arrow A) is in a direction away from the user 300. This peak radiation can be tilted down due to the curvature of the face and how the eyewear 100 is worn by the user 300. Put another way, the circular RF currents would create a magnetic field that is orthogonal to lens 112 surface, radiating towards the outer world. The eye cavity would give these fields the much needed separation from the head for maximum radiation efficiency and minimize specific absorption rate (SAR) for the radiation, a regulatory metric used for compliance of wireless systems.

Figure 4:
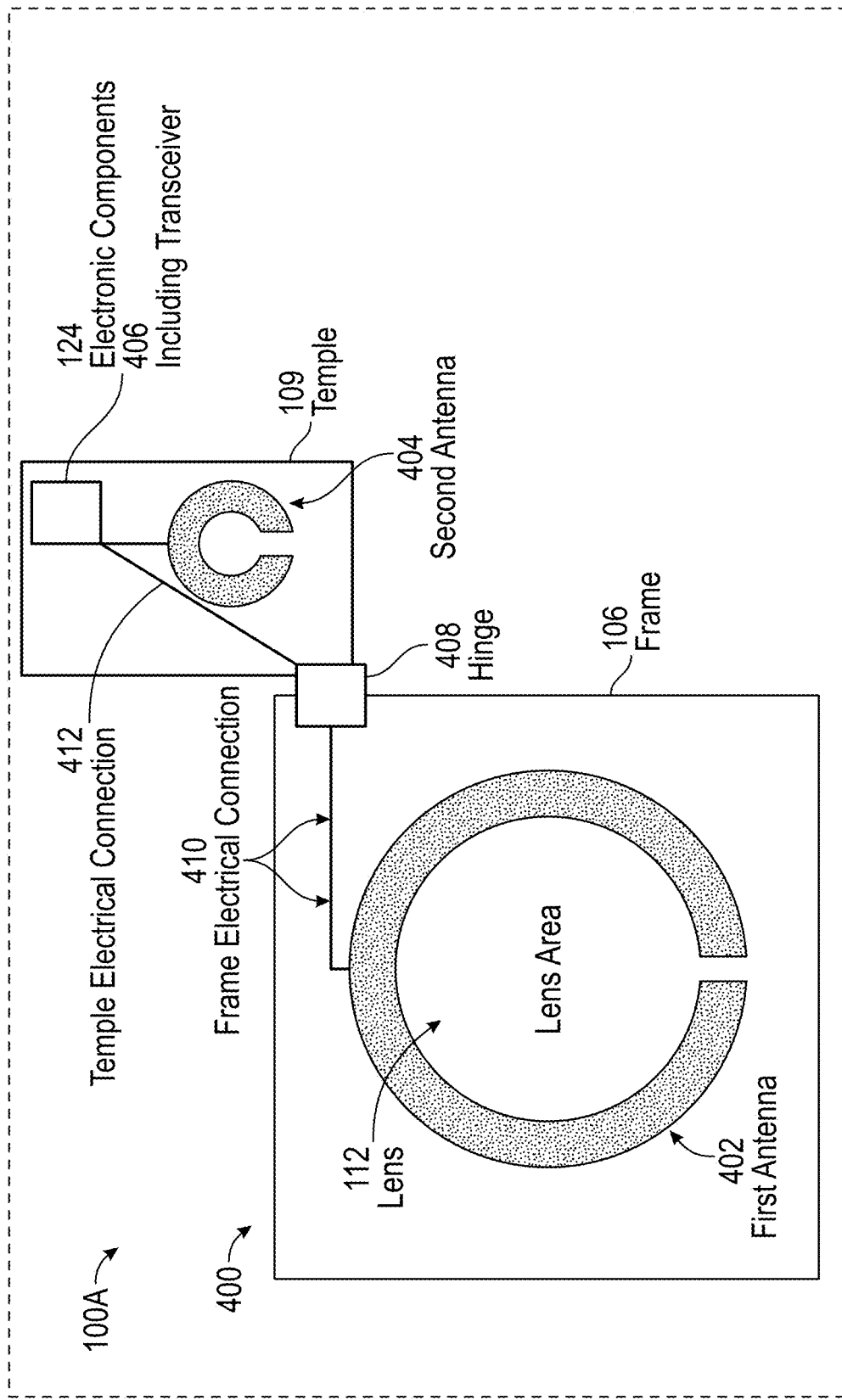
FIG. 4 is a schematic view of an example of the eyewear device having an antenna system with the first antenna carried by the frame and a second antenna carried by a temple, according to an example embodiment.

FIG. 4 is a highly schematic view of eyewear 100A similar to or identical in construction to that of the eyewear 100 of FIGS. 1-2A discussed previously. The eyewear 100A includes the frame 106, lens 112, one of the temples 109 and the one or more onboard electronics components 124. The eyewear 100A additionally includes an antenna system 400 including a first antenna 402, a second antenna 404 and a transceiver 406. The eyewear 100A additionally includes a hinge 408, frame electrical connection 410 and a temple electrical connection 412.

The frame 106 can be configured to hold one or more optical elements (e.g., the lens 112). The temple 109 can be connected to the frame 106 such as via the hinge 408 (an example of an articulated joint). Via the hinge 408 the temple can be disposable between a collapsed condition (not shown) and a wearable condition illustrated in FIG. 4. In the wearable condition, the eyewear 100A is wearable by a user to hold the one or more optical elements within user view. Additionally, the temple and components thereof including the second antenna 404 can be oriented substantially orthogonal to the frame 106 and the first antenna 402 when in the wearable condition.

The antenna system 400 can include the frame electrical connection 410 and the temple electrical connection 412 in addition to the first antenna 402, the second antenna 404 and the transceiver 406. The frame electrical connection 410 and the temple electrical connection 412 can allow for electronic communication with the first antenna 402 and the second antenna 404 among other functions. The first antenna 402 can have a construction similar to that of the first antenna of FIGS. 2A and 2B (e.g., can be a loop antenna). However, the first antenna 402 can differ in that rather than being formed by the material of the frame 106 (e.g., such as an electrically conductive metal or metal alloy), the first antenna 402 can be a distinct separate component that can be coupled to the frame 106 such as by embedding, insert molding or other known fabrication technique.

Figure 12A:
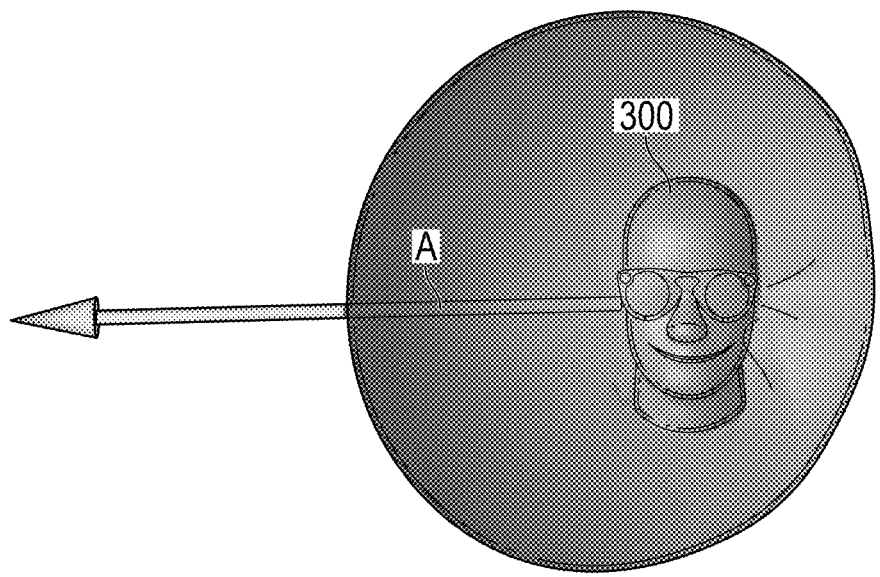
FIGS. 12A and 12B illustrate radiation patterns of the second antenna of FIGS. 9-11B carried by the temple, according to an example of the present application.
Figure 12B:
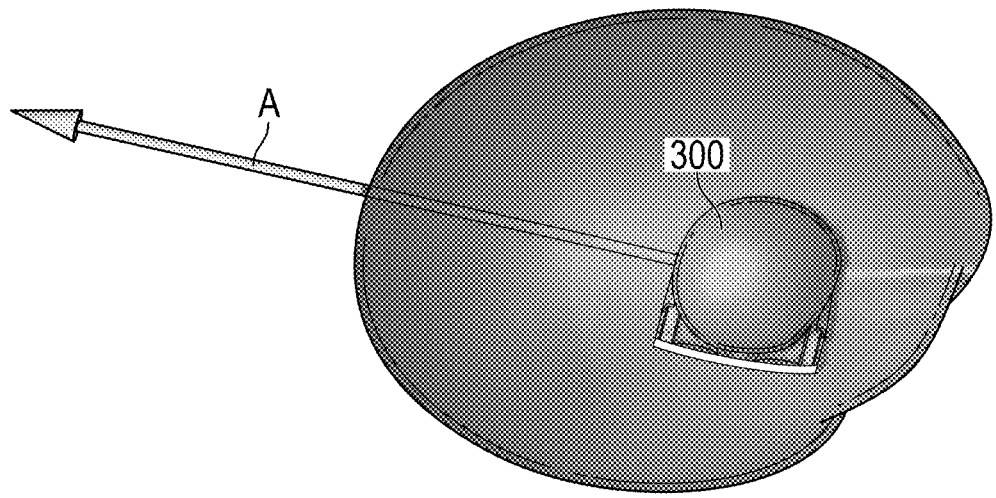

The second antenna 404 can be carried by the temple 109 as shown in FIG. 4. The orientation of the temple 109 in the wearable condition can orient the second antenna 404 substantially orthogonal to a plane of the first antenna 402, which can be desirable to reduce overlap between the first antenna 402 and the second antenna 404. As shown in FIG. 4, the second antenna 404 can be configured as a loop antenna (can utilize a conductive loop). This allows the second antenna 404 to have a radiation pattern similar to that of the first antenna 402 but at a substantially orthogonal direction thereto as illustrated in FIGS. 12A and 12B.

FIG. 4 merely provides an exemplary arrangement and configuration for the first antenna 402 and the second antenna 404 and other arrangements and configurations are contemplated. Other contemplated arrangements and configurations can orient the second antenna 404 substantially orthogonal to a plane in which the first antenna 402 lies.

Figure 5:
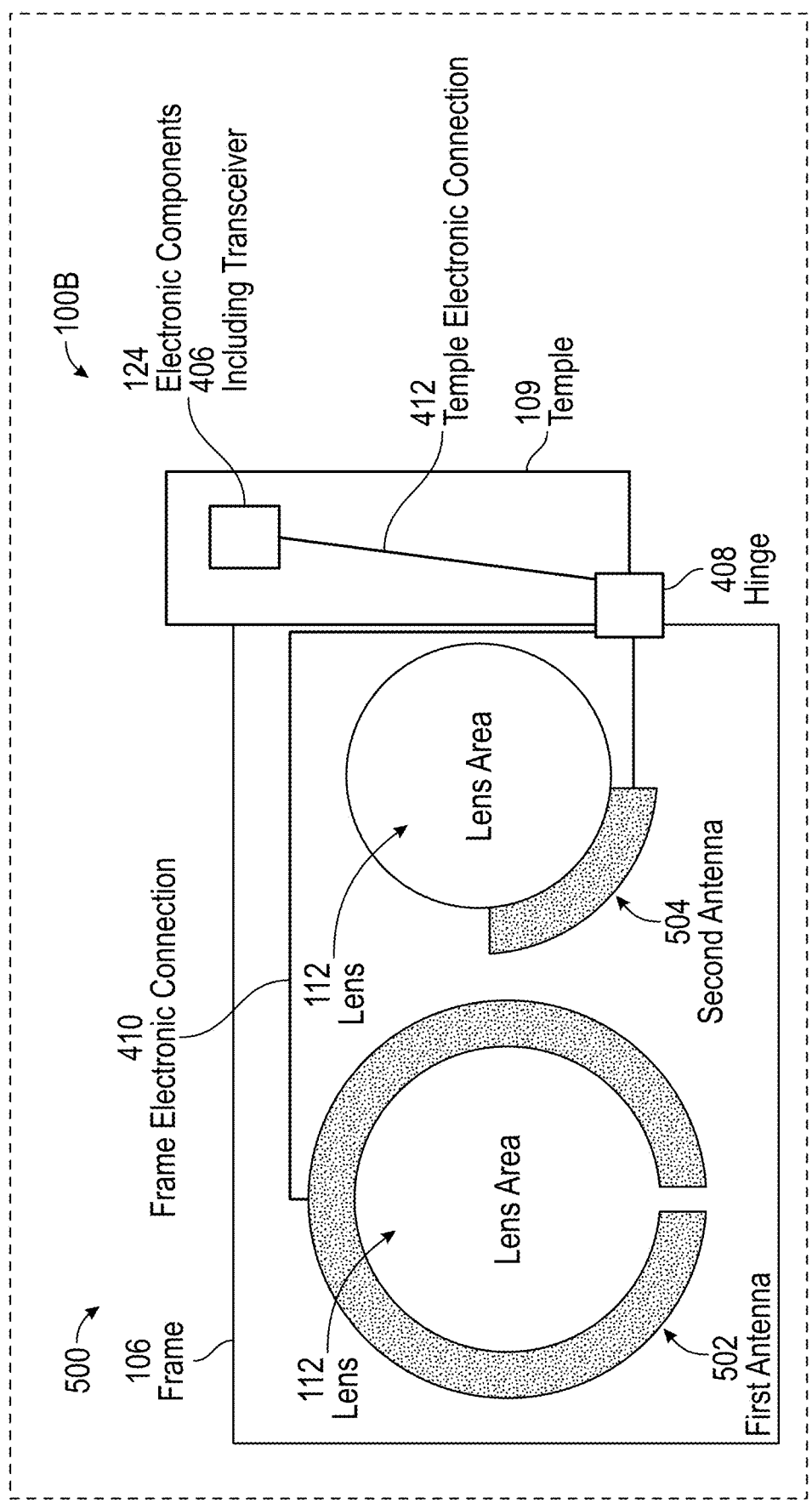
FIG. 5 is a schematic view of the eyewear device having an antenna system with the first antenna carried by the frame, the second antenna carried by the frame and a cellular transceiver carried by the temple, according to an example embodiment.

FIG. 5 is a highly schematic view of eyewear 100B similar to that of the eyewear 100 of FIGS. 1-2A and the eyewear 100A of FIG. 4 discussed previously. The eyewear 100B includes the frame 106, lens 112, one of the temples 109 and the one or more onboard electronics components 124. The eyewear 100B additionally includes an antenna system 500 including a first antenna 502, a second antenna 504 and the transceiver 406. The eyewear 100B also includes the hinge 408, the frame electrical connection 410 and the temple electrical connection 412 as previously discussed.

The eyewear 100B of FIG. 5 differ from previous examples in that the second antenna 504 can have a different construction from the first antenna 502 and can be carried by the frame 106 rather than the temple 109. While the first antenna 502 can be constructed as a loop antenna as previously discussed, the second antenna 504 is a non-loop antenna (sometimes called an incomplete loop, dipole, or monopole antenna). Generally, non-loop antennas comprise a linear (but not necessarily rectilinear) non-loop conductor. For monopole antennas, a signal feed point is connected to the non-loop conductor at an end of the conductor, while the signal feed point in a dipole antenna separates a dipole conductor in two linear arms. In contrast, a loop antenna (such as first antenna 502) comprises a loop-shaped conductor whose ends are connected to a signal feed point or transmission line. It is important to note that dipole antennas are also referred to herein as "electric type" or "E-type" antennas, since their main radiating mode is $TM_{10}$. This is meant that the antenna generates electric fields that are orthogonal to the direction of propagation. Similarly, loop antennas are called "magnetic type" antennas, since their main radiating mode as $TE_{10}$, with which is meant that the antenna generates magnetic fields that are orthogonal to the direction of propagation.

FIG. 5 provides an example of dipole-loop or monopole-loop hybrid antenna system 500. The antenna system 500 of FIG. 5 combines two fundamental antenna types, namely the first antenna 502 is a loop antenna and the second antenna 504 can be a dipole antenna or a monopole antenna. This provides a structure in which efficient radiation supported by the $TM_{10}$ and $TE_{10}$ modes is possible. The antenna system 500 of FIG. 5 is essentially a superposition of a loop and dipole antenna, in which their radiation patterns are orthogonal to each other, and in which the loop and dipole antennas radiate with different polarizations.

It should be noted that the second antenna 504 can be positioned so as to be coupled to or in close proximity with the lens 112 as discussed with previous examples of the first antenna (including the first antenna 502). Such positioning for the second antenna 504 is shown in FIG. 5. However, although such arrangement can be beneficial for the reasons discussed previously, the position of the second antenna 504 on the frame 106 is not limited to the position illustrated in FIG. 5 and other locations for the second antenna 504 on or as part of the frame 106 (or on or as part of the temple 109) are contemplated.

The second antenna 504 can be formed by the frame 106 or can be a separate component coupled to the frame (e.g., by embedding, insert molding or other technique as discussed previously). If separately formed from the frame 106, the second antenna 504 (and/or first antenna 502) can be formed by wire (e.g., copper wire, aluminum wire, nickel wire, etc.) embedded in a molded polymeric plastics material of the eyewear frame 106. The antenna can be part of a core wire that serves to provide structural integrity or rigidity to the frame 106 (or in some embodiments the temple 109).

FIG. 5 shows an example where the antenna system 500 utilizes portions of the antenna system 500, namely the cellular transceiver 506 and the temple electrical connection 412 that are carried by the temple 109.

Figure 6:
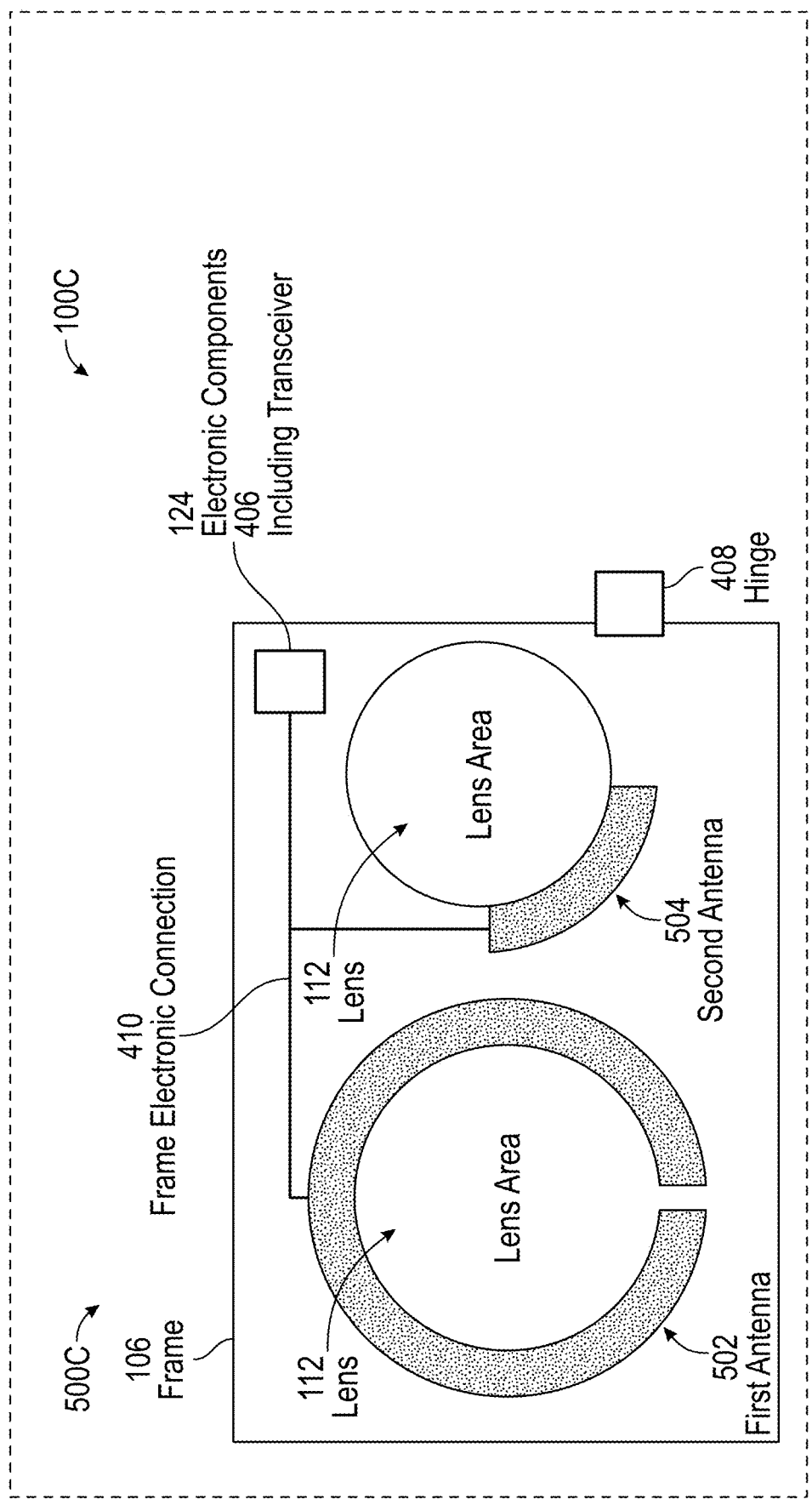
FIG. 6 is a schematic view of the eyewear device having an antenna system with the first antenna carried by the frame, the second antenna carried by the frame and the cellular transceiver carried by the frame, according to an example embodiment.

FIG. 6 shows eyewear 100C that differs from the eyewear of FIG. 5 in that the one or more onboard electronics components 124 including parts of the antenna system 500C have been eliminated from the temple (not shown). The eyewear 100C with the antenna system 500C includes the first antenna 502, the second antenna 504 and the transceiver 406. The eyewear 100C also includes the hinge 408 and the frame electrical connection 410. The temple electrical connection 412 (FIG. 5) has been eliminated. Put another way, the antenna system 500C including the transceiver 406 is entirely carried by the frame 106 in the example of FIG. 6.

Figure 7:
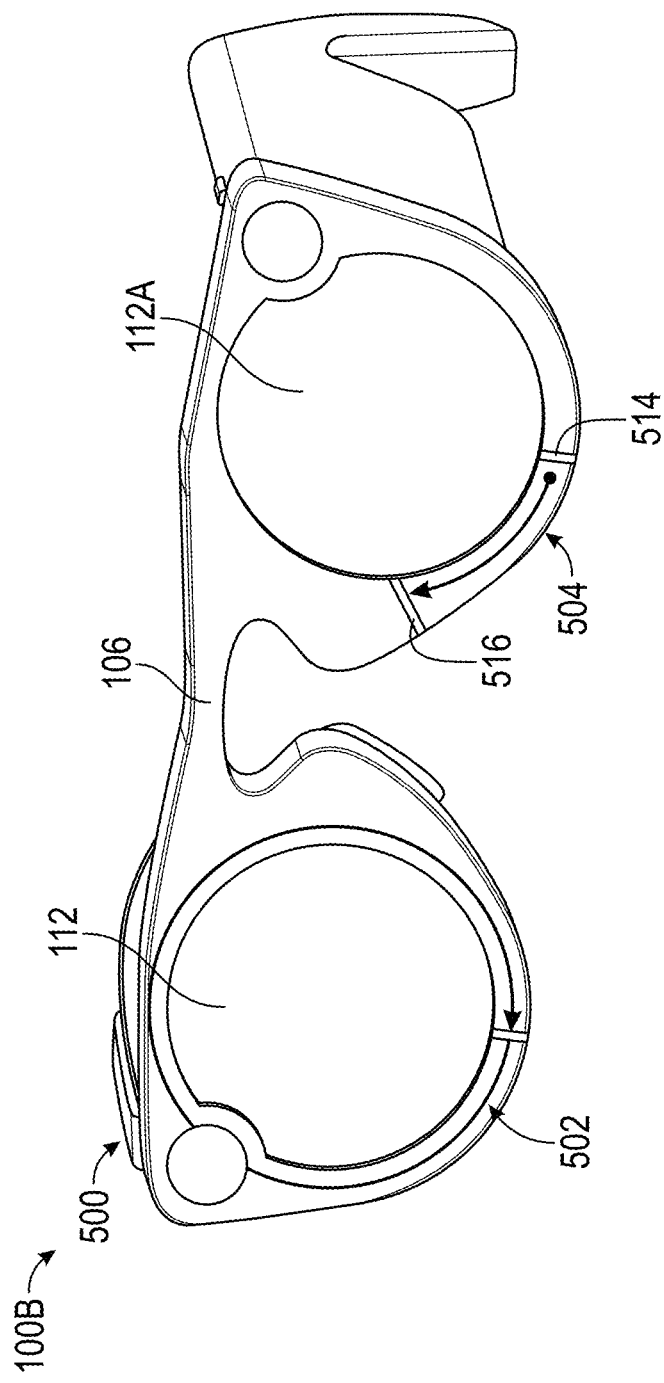
FIG. 7 is a perspective view of the eyewear device having the antenna system of FIG. 5, according to an example embodiment.

FIG. 7 shows an example of the eyewear 100B such as previously illustrated in the schematic of FIG. 5. The eyewear 100B can be outfitted with the antenna system 500 having the first antenna 502 and the second antenna 504. The first antenna 502 can be coupled to the lens 112 and can be part of the frame 106 as previously discussed. The second antenna 504 can be coupled to or can be in close proximity to a second lens 112A and can comprise the non-loop antenna (e.g., a loaded monopole antenna) as previously discussed. As shown in FIG. 7, the second antenna 504 can be formed by the frame 106. The frame 106 can be configured to hold the second lens 112A in a lens area. The second antenna 504 can be disposed around a relatively smaller portion of a periphery of the second lens 112A as compared with the portion of the periphery of the lens 112 coupled to the first antenna 502.

The second antenna 504 requires two nonconductive gaps 514 and 516 in the frame 106. One gap 514 is for excitation and the other gap 516 for termination of the loaded monopole antenna. In this antenna design for the second antenna 504, the electric fields generated by the RF currents would be tangential to the surface of the lens 112A, radiating towards the head and also the outer world. The eye cavity would give these fields the much needed separation from the head for maximum radiation efficiency. Use of the second antenna 504 as the loaded monopole design in addition to the loop design of the first antenna 502 can provide for flexibility allowing the two different antennas to be specifically tailored to specific operating cellular band.

Thus, for example, FIG. 7 discloses a hybrid antenna system having a loop antenna peripheral to (coupled to or immediately adjacent) one lens and a dipole or monopole antenna at (coupled to or immediately adjacent) the other lens, with these two different antennas being connected to a transceiver and configured to receive a common cellular (or other wireless) signal.

FIG. 7 illustrates current paths with arrows for both the first antenna 502 and the second antenna 504 including the generating of the current at or adjacent the gap 514 and the termination of the current at or adjacent the gap 516 for the second antenna.

Figure 8:
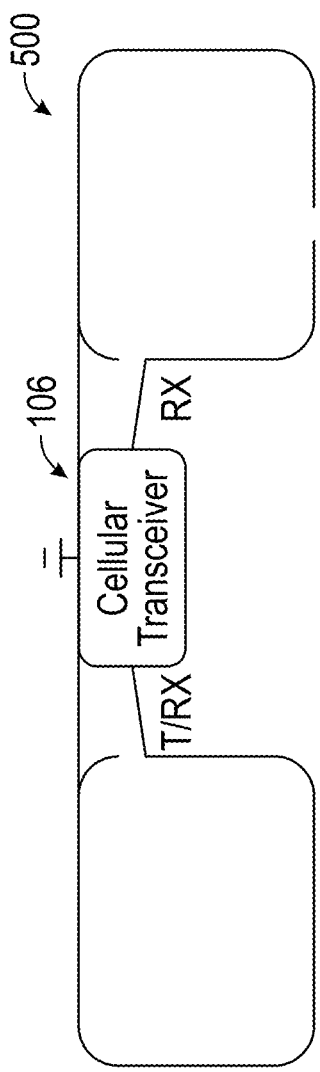
FIG. 8 is a highly schematic illustration of the antenna system of FIG. 5, according to an example embodiment.

The antenna system 500 of FIG. 7 is schematically illustrated in FIG. 8. As shown in FIGS. 7 and 8, the loop antenna offers great radiation efficiency and excellent SAR performance. The H-fields that are generated by this antenna are normal to the glass lens surface and the peak radiation occurs towards the sky and the ground. The loaded monopole antenna offers good antenna radiation performance. The E-fields that are generated by this antenna are tangential to the glass lens surface and the peak radiation occurs towards the head and away from the eyes. As such, the loop antenna and the loaded monopole antenna essentially have orthogonal radiating fields, which technically translates into excellent isolation properties (ideally zero or minimal correlation). As such, an antenna architecture candidate for an AR wearable device would be having a loop antenna around one glass lens, and a loaded monopole antenna around the other lens. The loop antenna, due to its excellent SAR performance, would be the perfect candidate for the main cellular antenna element responsible for both uplink and downlink (T/RX in FIG. 8), and the loaded monopole antenna would be the perfect candidate for the secondary cellular antenna element responsible for the downlink (RX in FIG. 8). As shown in FIG. 8, the cellular RF front end (including the cellular transceiver) can be located at the center or the frame 106, just above the nose pads to minimize the path loss in connecting the cellular transceiver to these antenna elements. This arrangement is shown in FIG. 8.

Figure 9:
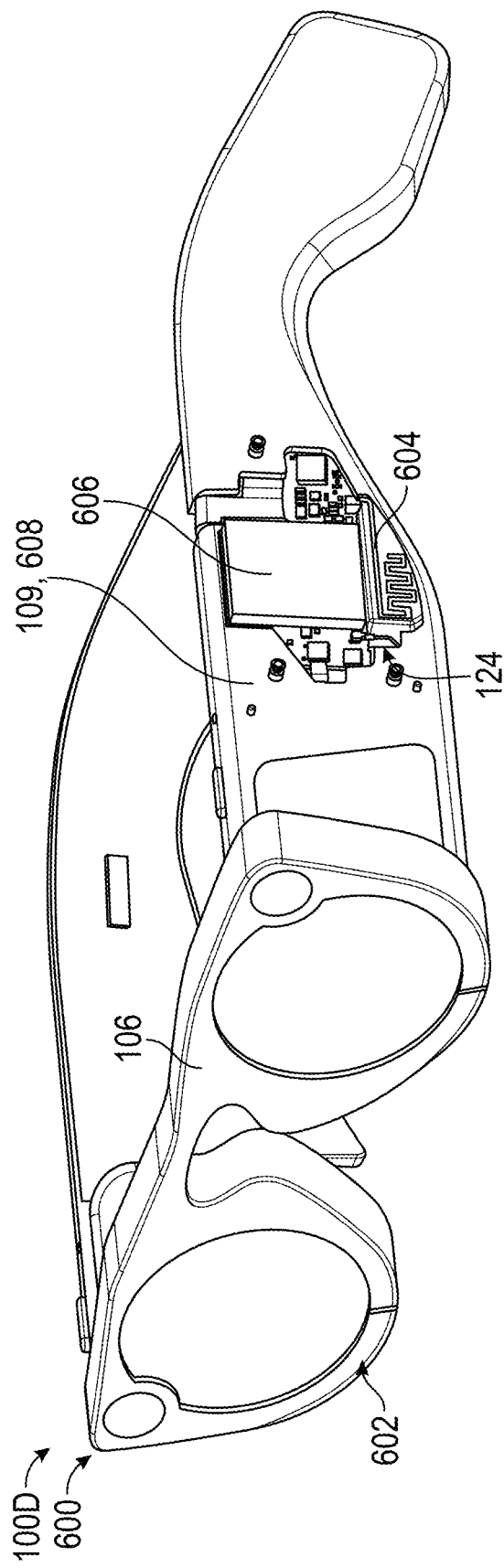
FIG. 9 is a perspective view of an eyewear device including a temple and a frame with a portion of the temple removed to illustrate onboard electronic components including a cellular transceiver and a second antenna, according to an example embodiment.
Figure 10:
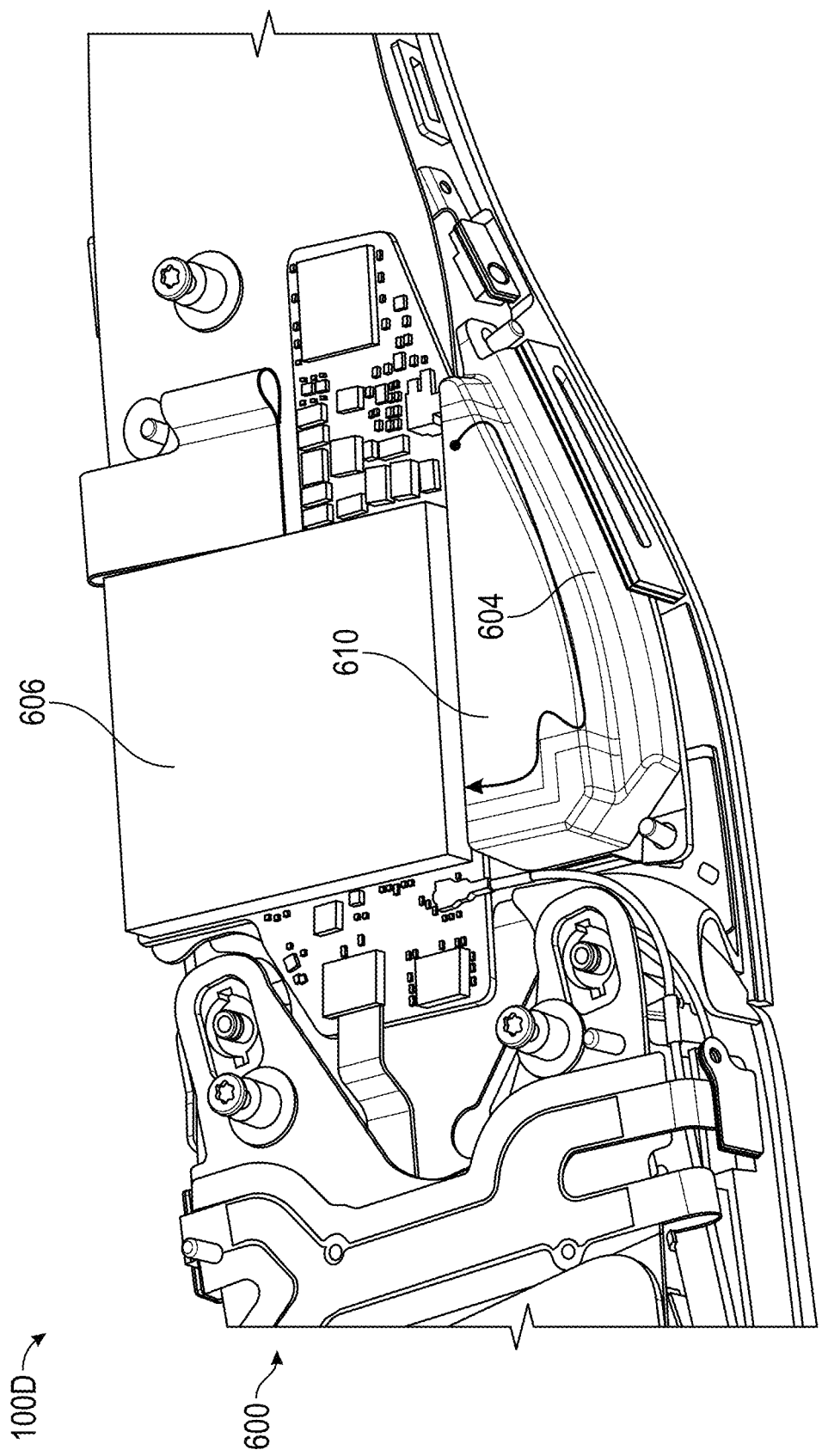
FIG. 10 is an enlarged view of the temple of FIG. 9 further illustrating a current flow path along the second antenna to the cellular transceiver, according to an example embodiment.

FIGS. 9 and 10 show eyewear 100D with an antenna system 600. The frame 106 can carry at least one antenna 602 of the antenna system 600. This at least one antenna 602 can be located at or adjacent the lens 112 such as coupled to the lens 112 as discussed previously. The antenna system 600 can include a second antenna 604 and a transceiver 606 and other of the one or more electronics components 124 carried by the temple 109.

FIG. 9 shows a portion of a housing 608 of the temple 109 broken away to show the second antenna 604 and the transceiver 606. FIG. 10 shows a housing of the temple 109 removed entirely. As shown in FIG. 10, the second antenna 604 can be coupled to a speaker carrier 610.

In the embodiment of FIGS. 9 and 10, the second antenna 604 can be configured as a loop antenna. FIG. 10 shows a current flow path along the second antenna 604 to the cellular transceiver 606. The current path as illustrated shows a launch point for the second antenna 604 and a grounded termination point.

As the temple 109 can be arranged substantially orthogonal to the frame 106 when in the wearable condition as previously discussed and illustrated, such arrangement can maximize isolation of the one or more antennas 602 of the frame 106 from the second antenna 604 of the temple 109. To maximize isolation between the two antennas 602 and 604, if the one or more antennas 602 on the frame 106 is configured as a loop antenna, the second antenna 604 should also be configured as a loop antenna. However, if the one or more antennas 602 on the frame 106 is configured as a non-loop antenna, the second antenna 604 should also be configured as a non-loop antenna. Although the second antenna 604 is shown as placed on the speaker carrier 608, the second antenna 604 could be placed in another location such as on the main PCB itself.

Figure 11A:
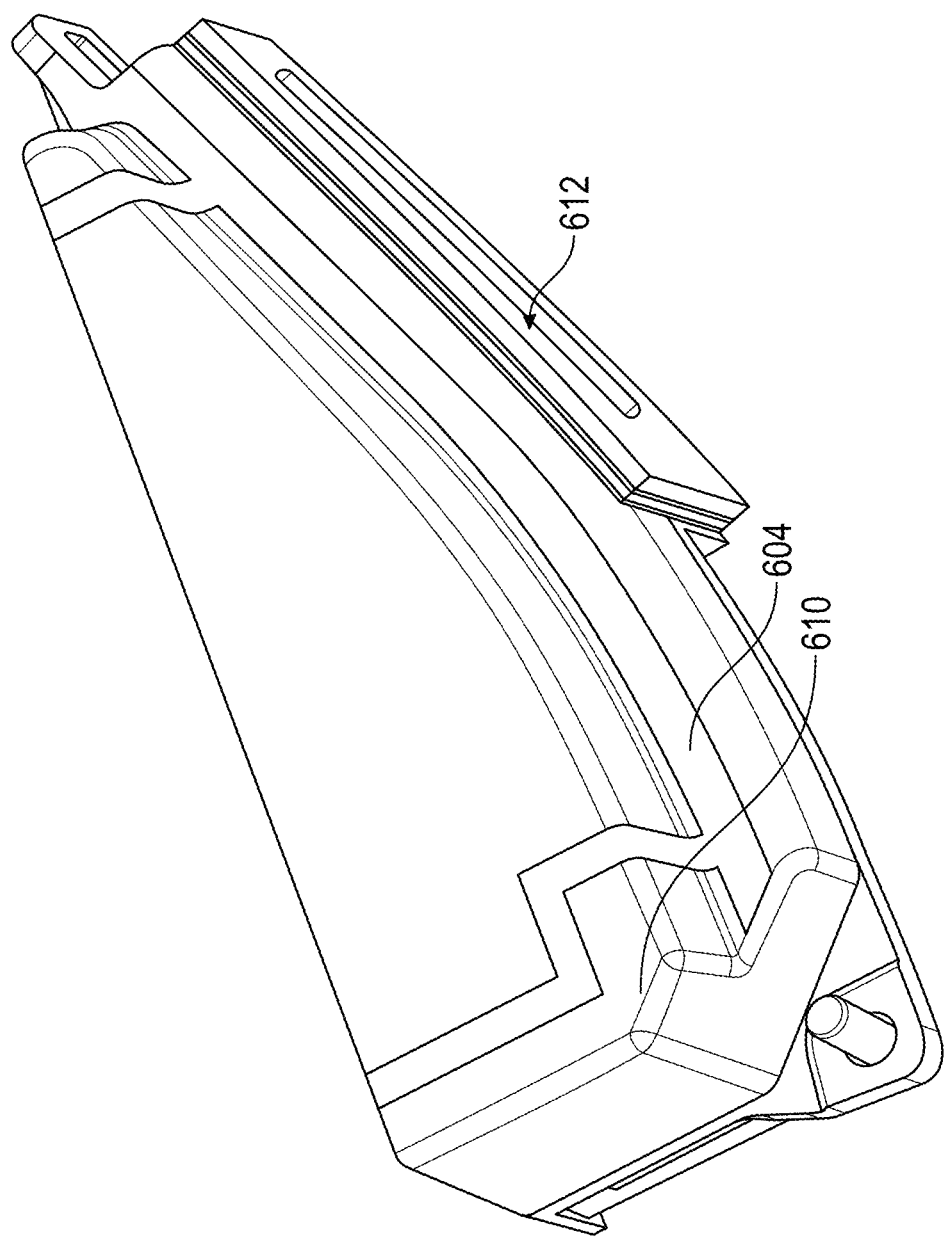
FIGS. 11A and 11B show the second antenna of FIGS. 9 and 10 coupled to a speaker carrier, according to an example embodiment.
Figure 11B:
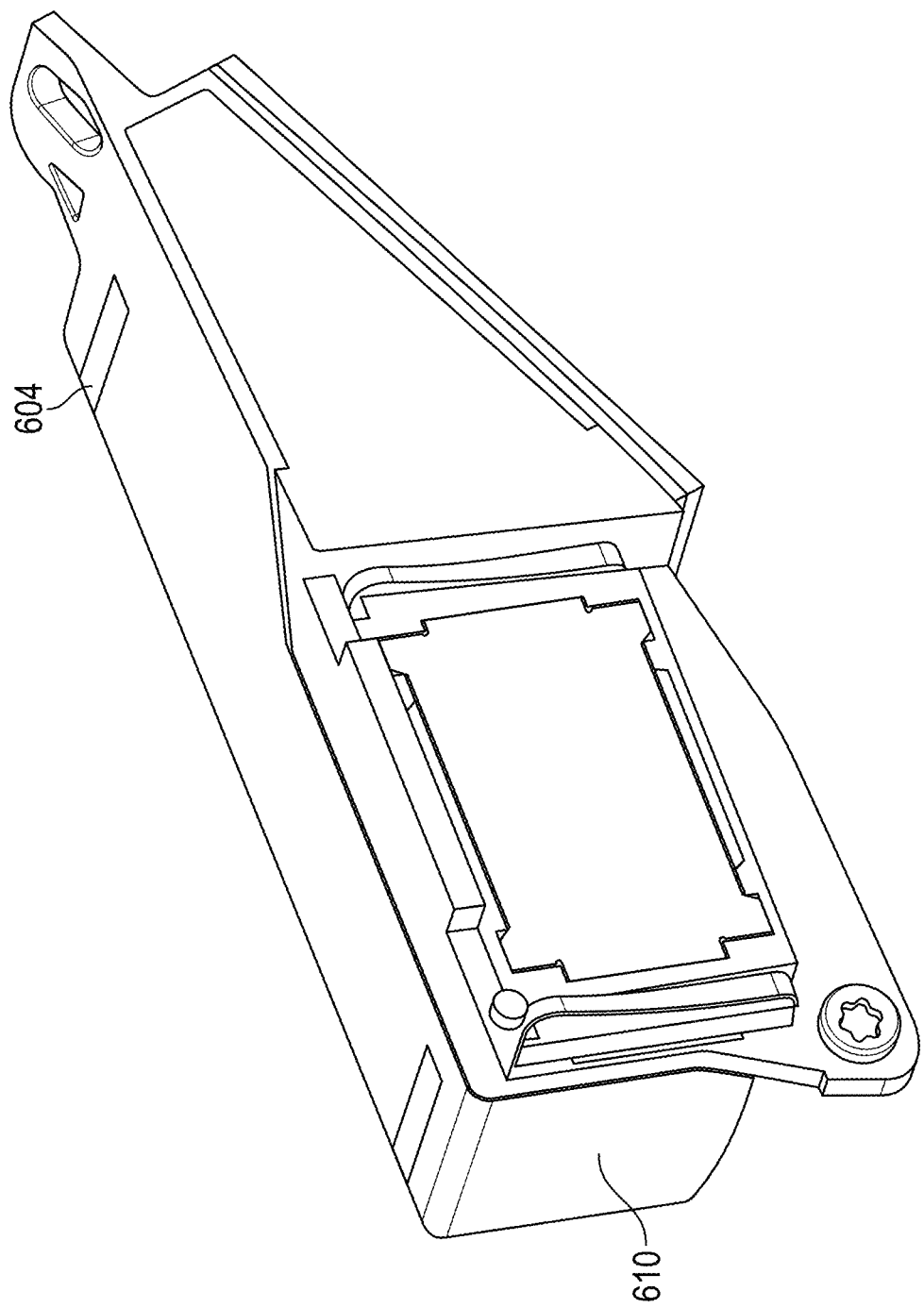

FIGS. 11A and 11B show the second antenna 604 coupled to the speaker carrier 610 in further detail. As speaker systems typically need a carrier to channel the air from the driver element to the outer world, they must utilize a cavity or cavities. FIG. 11A shows a speaker port 612 that provides a cavity in the speaker carrier 610. The cavities inside these carriers are carefully engineered to provide amplifications of the audible frequencies and dampen the unwanted ones. The cavity walls are typically made out of RF friendly plastic materials and are filled with air. Thus, designing the second antenna 604 that would be attached to the exterior surface of a speaker carrier offers an excellent dual-use opportunity. The second antenna 604 can be designed as a stamp metal, a flexible printed circuit board, or can be embedded in the speaker carrier 610 via laser direct structuring process.

FIGS. 12A and 12B show radiation patterns associated with operation of the second antenna 604 (FIGS. 9-11B). As shown, the construction of the second antenna 604 forms a beam that radiates away from a face and ear of the user 300. Peak radiation (indicated with arrow A) is away from the user 300. As shown in TABLE 2 below show very low levels of correlation between the two antennas. Thus, the two antennas essentially operate independent of one another.

TABLE 2

|  | Envelope Correlation | Complex Correlation | Comp. Corr. Mag. |
|---|---|---|---|
| From 3-D Pattern: | 0.000299561 | 0.0172784-0.00100883 j | 0.0173078 |
| From 2-D Pattern: | 0.052227 | 0.0456698-0.223922 j | 0.228532 |

Figure 13:
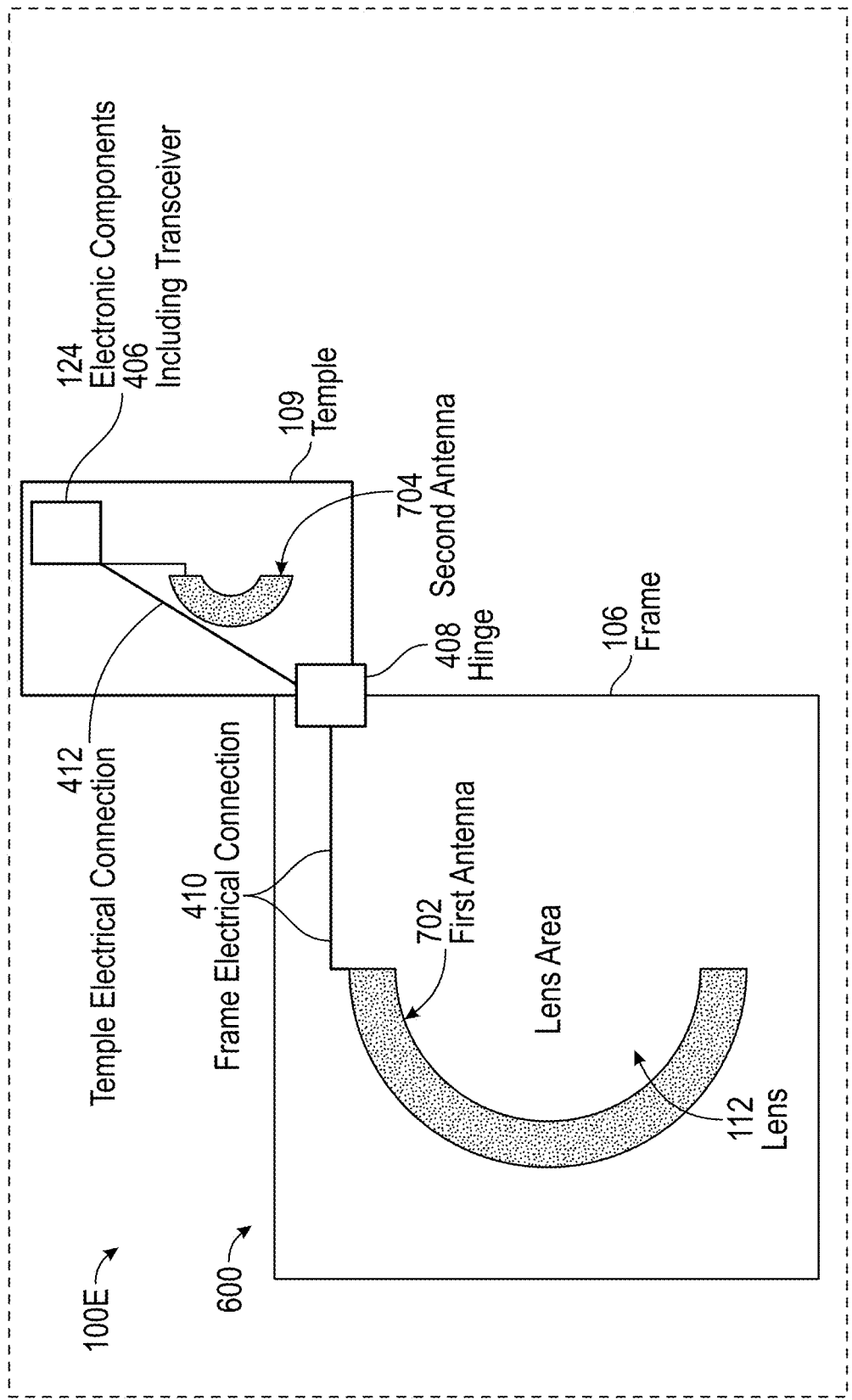
FIG. 13 is a schematic view of an example of the eyewear device having another antenna system with the first antenna carried by the frame and a second antenna carried by a temple, according to an example embodiment.

FIG. 13 shows is a highly schematic view of eyewear 100E similar in construction to that of the eyewear 100A of FIG. 4 discussed previously. The eyewear 100E includes the frame 106, lens 112, one of the temples 109 and the one or more onboard electronics components 124. The eyewear 100E additionally includes an antenna system 700 including a first antenna 702, a second antenna 704 and the transceiver 406. The eyewear 100E additionally includes a hinge 408, frame electrical connection 410 and a temple electrical connection 412 as previously discussed in reference to FIG. 4.

The antenna system 700 differs from that of FIG. 4 in that the first antenna 702 is a non-loop antenna and the second antenna 704 is a non-loop antenna. The first antenna 702 can be carried by the frame 106 (e.g., can be part of the frame 106 or can be a separate component from the frame 106 that is coupled thereto as previously discussed). The second antenna 704 can be carried by the temple 109.

Figure 14:
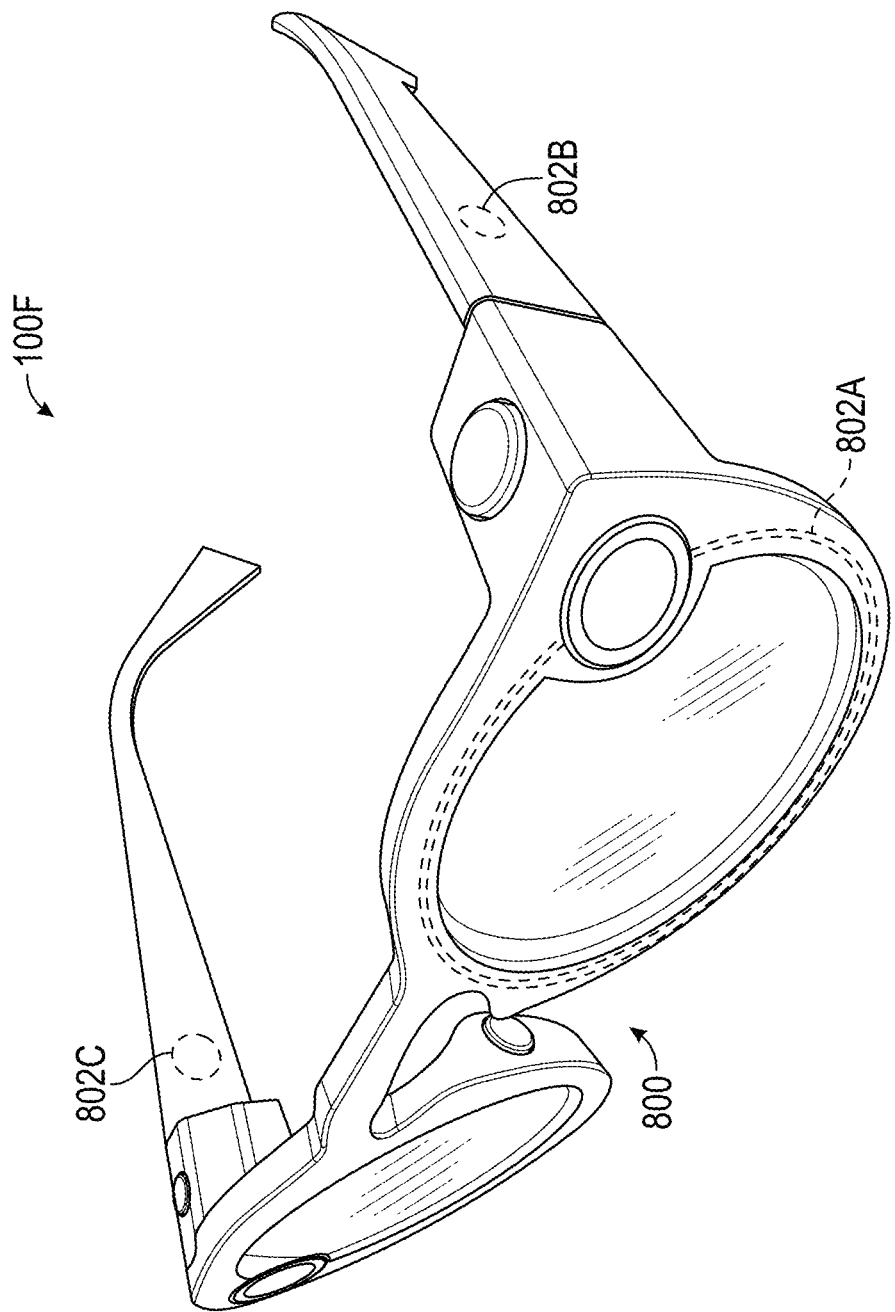
FIG. 14 is a perspective view of an electronics-enabled eyewear device having an antenna system with at least three antennas, according to an example embodiment.

FIG. 14 shows eyewear 100F with an antenna system 800 the includes three or more antennas 802A, 802B and 802C that can be configured and utilized according to the principles discussed herein for cellular communication.

Figure 15:
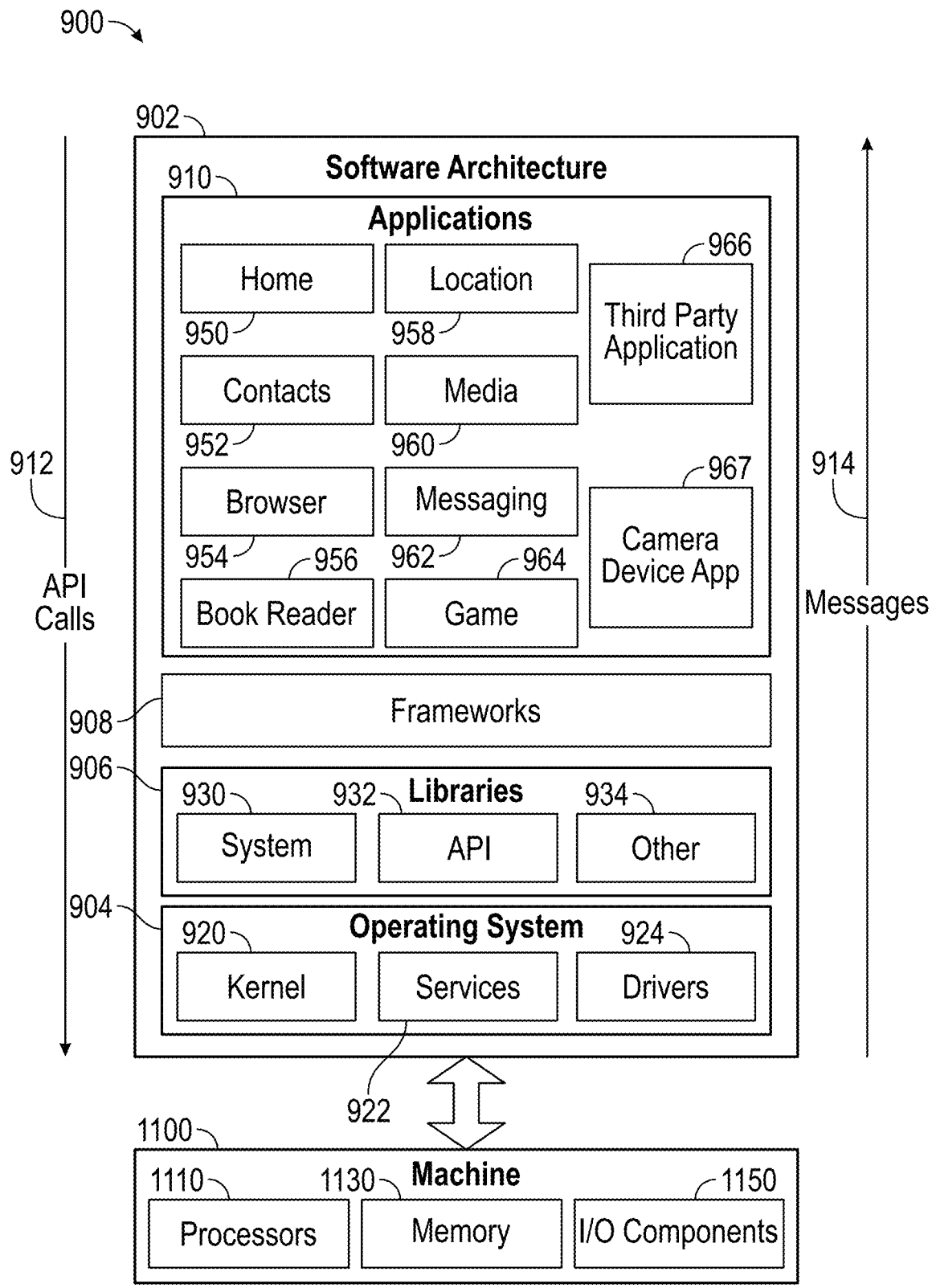
FIG. 15 is a block diagram illustrating an example of a software architecture that may be installed on a machine according to some example embodiments.

FIG. 15 is a block diagram 900 illustrating a software architecture 902, which can be installed on any one or more of the eyeglasses or an accompanying host device (e.g., smartphone), glasses case, charge source, or other system coupled to the eyeglasses. FIG. 15 is merely a non-limiting example of a software architecture 902, and it will be appreciated that many other architectures can be implemented to facilitate the functionality described herein. In various embodiments, the software architecture 902 is implemented by hardware such as machine 1100 of FIG. 16 that includes processors 1110, memory 1130, and I/O components 1150. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), cellular drivers, WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application 910 developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Some embodiments may particularly include a curation application 967. In certain embodiments, this may be a stand-alone application that operates to manage communications with a server system. In other embodiments, this functionality may be integrated with another application such as a media application 960 or another such application. Curation application 967 may manage collection of content using a camera device of machine 1100, communication with a server system via I/O components 1150, and receipt and storage of received media collections in memory 1130. Presentation of content and user inputs associated with content may be managed by curation application 967 using different frameworks 908, library 906 elements, or operating system 904 elements operating on a machine 1100.

Figure 16:
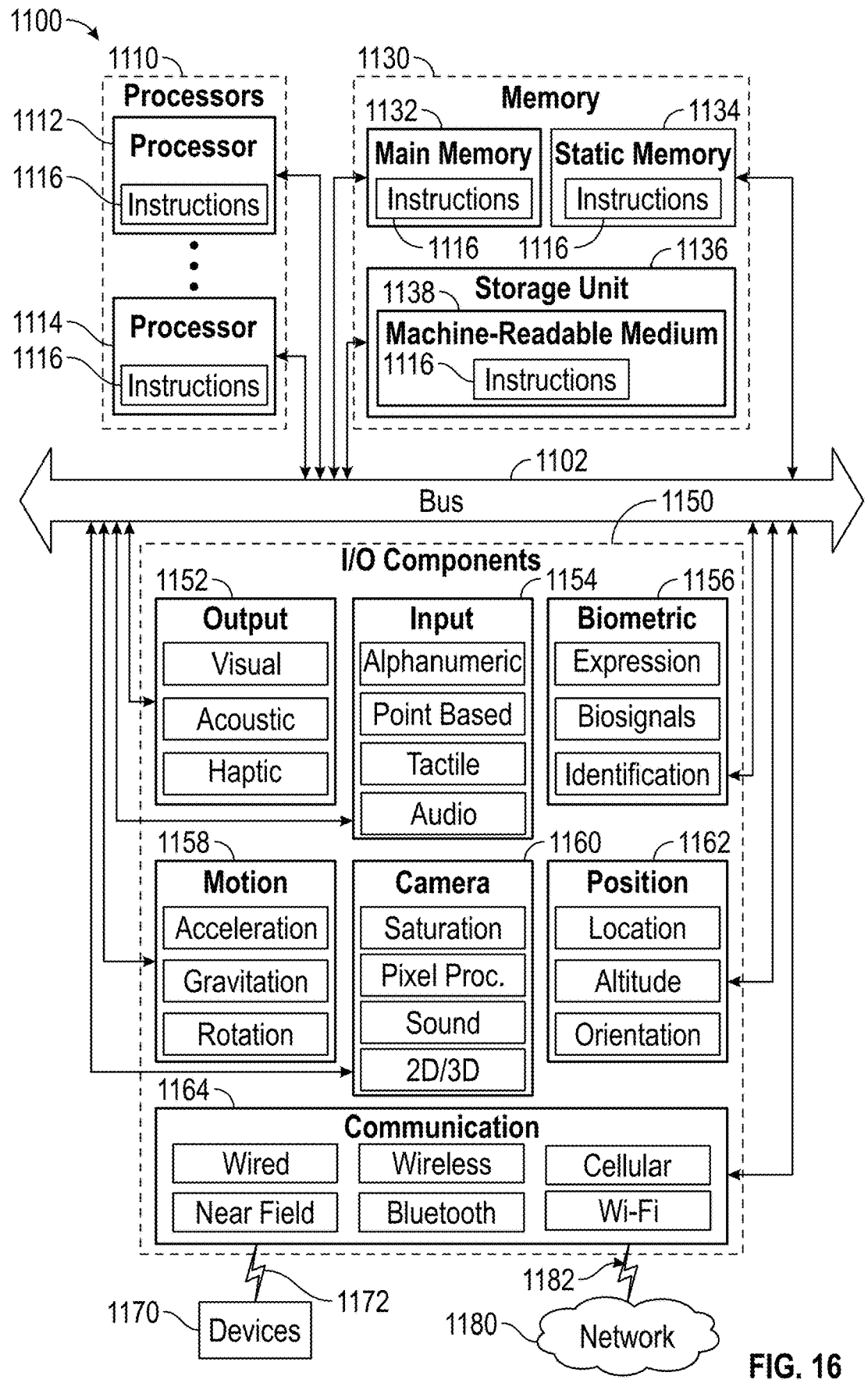
FIG. 16 illustrates a diagrammatic representation of a machine in the form of a computer system within which a set of instructions may be executed for causing the machine to perform any one or more of the methodologies discussed herein, according to some example embodiments.

FIG. 16 is a block diagram illustrating components of a machine 1100, according to some embodiments, able to read instructions from a machine-readable medium (e.g., a machine-readable storage medium) and perform any one or more of the methodologies discussed herein. Specifically, FIG. 16 shows a diagrammatic representation of the machine 1100 in the example form of a computer system, within which instructions 1116 (e.g., software, a program, an application 910, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server or device in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 16 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 16. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and force of touches or touch gestures, or other tactile input components), audio input components (e.g., a microphone), and the like.

In some further example embodiments, the I/O components 1150 include biometric components 1156, motion components 1158, camera 1160 environmental components, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. Camera components include any information for image capture, such as saturation control, pixel processing, sound capture, three dimensional image processing, etc. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near-field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1180 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

Note that although the disclosure herein of a device that incorporates antenna systems, as disclosed, is directed primarily to the example embodiment of an eyewear device, antenna systems as disclosed may in other embodiments be incorporated in different types of electronic devices. Thus, for example, the disclosed antenna systems can be profitably employed in other wearable electronic devices, mobile electronic devices (such as mobile phones, tablets, or the like), and/or larger products such as motor vehicles or the like.

The foregoing description includes devices, systems techniques, instruction sequences, and computing machine program products that embody illustrative embodiments of the disclosure. In the above description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The following numbered examples is a non-exhaustive list of selected illustrative embodiments in accordance with various aspects of the present disclosure.

CLAIMS RELATED EXAMPLES

In some aspects, the techniques described herein relate to a wearable device, including any one or combination of: a frame configured to hold one or more optical elements; a temple connected to the frame at a joint such that the temple is disposable between a collapsed condition and a wearable condition in which the wearable device is wearable by a user to hold the one or more optical elements within user view; onboard electronics components carried by at least one of the frame and the temple; a first antenna configured for cellular communication carried by the frame; and a second antenna configured for cellular communication carried by one of the frame or the temple.

In some aspects, the techniques described herein relate to a wearable device, wherein optionally the frame is configured to hold a first lens including one of the one or more optical elements in a lens area, and wherein the first antenna is disposed around at least a portion of a periphery of the first lens and is coupled the first lens such that the first lens acts as an antenna substrate for the first antenna.

In some aspects, the techniques described herein relate to a wearable device, wherein optionally the first antenna is formed by the frame or is a separate component coupled to the frame.

In some aspects, the techniques described herein relate to a wearable device, wherein optionally the first antenna is formed by the frame is configured to form a loop for a current path around substantially an entirety of the first lens, and wherein the current path is generated at or adjacent a gap in the frame filled by an electrically insulative material.

In some aspects, the techniques described herein relate to a wearable device, wherein optionally the second antenna is one of: formed by the frame; or coupled to a speaker carrier of the temple.

In some aspects, the techniques described herein relate to a wearable device, wherein optionally the second antenna has a configuration that differs from a configuration of the first antenna.

In some aspects, the techniques described herein relate to a wearable device, wherein optionally the second antenna is formed by the frame, wherein the frame is configured to hold a second lens including a second one of the one or more optical elements in a lens area, and wherein the second antenna is disposed around a relatively smaller portion of a periphery of the second lens as compared with the portion of the periphery of the first lens coupled to the first antenna.

In some aspects, the techniques described herein relate to a wearable device, wherein optionally the second antenna forms an incomplete loop around the second lens.

In some aspects, the techniques described herein relate to a wearable device, wherein optionally the onboard electronics components include a cellular transceiver, and wherein the first antenna and the second antenna are both in electronic communication with the cellular transceiver and are both configured for communication with a common cellular signal.

In some aspects, the techniques described herein relate to a wearable device, including any one or combination of: a frame configured to hold one or more optical elements; a temple moveably connected to the frame; onboard electronics components carried by at least one of the frame and the temple, wherein the onboard electronics components include a cellular transceiver; a first antenna configured for cellular communication formed by the frame at a first portion of the frame that is configured to hold a first lens including one of the one or more optical elements in a lens area, and wherein the first antenna is disposed around at least a portion of a periphery of the first lens and is coupled the first lens such that the first lens acts as an antenna substrate for the first antenna; and a second antenna configured for cellular communication carried by one of the frame or the temple.

In some aspects, the techniques described herein relate to a wearable device, wherein the first antenna is formed by the frame is configured to form a loop for a current path around substantially an entirety of the first lens, and wherein the current path is generated at or adjacent a gap in the frame filled by an electrically insulative material.

In some aspects, the techniques described herein relate to a wearable device, wherein optionally the second antenna is formed by the frame and is configured as a loaded monopole antenna, and wherein the first antenna is formed by the frame and includes a loop antenna.

In some aspects, the techniques described herein relate to a wearable device, wherein optionally the frame is configured to hold a second lens including a second one of the one or more optical elements in a lens area, and wherein the second antenna is disposed around a relatively smaller portion of a periphery of the second lens as compared with the portion of the periphery of the first lens coupled to the first antenna.

In some aspects, the techniques described herein relate to a wearable device, wherein optionally the second antenna is carried by the temple and includes a loop antenna.

In some aspects, the techniques described herein relate to a wearable device, wherein optionally the second antenna is coupled to a speaker carrier of the temple.

In some aspects, the techniques described herein relate to a wearable device, wherein optionally the temple is selectively moveable to a substantially orthogonal arrangement relative to the frame in a wearable position to orient the second antenna substantially orthogonal to the first antenna.

In some aspects, the techniques described herein relate to an eyewear device including any one or combination of: an frame configured for supporting one or more lenses within view of a user; a temple moveably connected to the frame; and onboard electronics incorporated in at least one of the temple or the frame and including an antenna system housed in at least one of the temple or the frame and connected to others of the onboard electronics to provide wireless cellular connectivity to the eyewear device, the antenna system including: a first one of a loop electrical conductor or a non-loop electrical conductor formed by the frame; a second one of a loop electrical conductor or a non-loop electrical conductor carried by the temple; and a transceiver connected in common to the loop electrical conductor and the non-loop electrical conductor to receive electrical signals through both the loop electrical conductor and the non-loop electrical conductor.

In some aspects, the techniques described herein relate to an eyewear device, wherein optionally if the first one of the loop electrical conductor or the non-loop electrical conductor formed by the frame includes the loop electrical conductor the second one of the loop electrical conductor or the non-loop electrical conductor carried by the temple includes the loop electrical conductor.

In some aspects, the techniques described herein relate to an eyewear device, wherein optionally the frame is configured to hold a first lens of the one or more lenses in a lens area, and wherein the first one of the loop electrical conductor or the non-loop electrical conductor formed by the frame is disposed around at least a portion of a periphery of the first lens and is coupled the first lens such that the first lens acts as an antenna substrate for the first antenna.

In some aspects, the techniques described herein relate to an eyewear device, wherein optionally the second one of the loop electrical conductor or the non-loop electrical conductor carried by the temple is coupled to a speaker carrier of the temple.

What is claimed, is:
1. A wearable device, comprising:
a frame configured to hold one or more optical elements;
a temple connected to the frame at a joint such that the temple is disposable between a collapsed condition and a wearable condition in which the wearable device is wearable by a user to hold the one or more optical elements within user view;
onboard electronics components carried by at least one of the frame and the temple;
a first antenna configured for cellular communication carried by the frame; and
a second antenna configured for cellular communication carried by one of the frame or the temple;
wherein the frame is configured to hold a first lens comprising one of the one or more optical elements in a lens area, and wherein the first antenna is disposed around at least a portion of a periphery of the first lens and is coupled the first lens such that the first lens acts as an antenna substrate for the first antenna.

2. The wearable device of claim 1, wherein the first antenna is formed by the frame or is a separate component coupled to the frame.

3. The wearable device of claim 2, wherein the first antenna is formed by the frame is configured to form a loop for a current path around substantially an entirety of the first lens, and wherein the current path is generated at or adjacent a gap in the frame filled by an electrically insulative material.

4. The wearable device of claim 1, wherein the second antenna is one of:
formed by the frame; or
coupled to a speaker carrier of the temple.

5. The wearable device of claim 1, wherein the second antenna has a configuration that differs from a configuration of the first antenna.

6. The wearable device of claim 5, wherein the second antenna is formed by the frame, wherein the frame is configured to hold a second lens comprising a second one of the one or more optical elements in a lens area, and wherein the second antenna is disposed around a relatively smaller portion of a periphery of the second lens as compared with the portion of the periphery of the first lens coupled to the first antenna.

7. The wearable device of claim 6, wherein the second antenna forms an incomplete loop around the second lens.

8. The wearable device of claim 1, wherein the onboard electronics components include a cellular transceiver, and wherein the first antenna and the second antenna are both in electronic communication with the cellular transceiver and are both configured for communication with a common cellular signal.

9. A wearable device, comprising:
a frame configured to hold one or more optical elements;
a temple moveably connected to the frame;
onboard electronics components carried by at least one of the frame and the temple, wherein the onboard electronics components include a cellular transceiver;
a first antenna configured for cellular communication formed by the frame at a first portion of the frame that is configured to hold a first lens comprising one of the one or more optical elements in a lens area, and wherein the first antenna is disposed around at least a portion of a periphery of the first lens and is coupled the first lens such that the first lens acts as an antenna substrate for the first antenna; and
a second antenna configured for cellular communication carried by one of the frame or the temple, wherein the second antenna is carried by the temple and comprises a loop antenna.

10. The wearable device of claim 9, wherein the first antenna is formed by the frame is configured to form a loop for a current path around substantially an entirety of the first lens, and wherein the current path is generated at or adjacent a gap in the frame filled by an electrically insulative material.

11. The wearable device of claim 10, wherein the second antenna is formed by the frame and is configured as a loaded monopole antenna, and wherein the first antenna is formed by the frame and comprises a loop antenna.

12. The wearable device of claim 11, wherein the frame is configured to hold a second lens comprising a second one of the one or more optical elements in a lens area, and wherein the second antenna is disposed around a relatively smaller portion of a periphery of the second lens as compared with the portion of the periphery of the first lens coupled to the first antenna.

13. The wearable device of claim 10, wherein the second antenna is coupled to a speaker carrier of the temple.

14. The wearable device of claim 9, wherein the temple is selectively moveable to a substantially orthogonal arrangement relative to the frame in a wearable position to orient the second antenna substantially orthogonal to the first antenna.

15. An eyewear device comprising:
an frame configured for supporting one or more lenses within view of a user;
a temple moveably connected to the frame; and
onboard electronics incorporated in at least one of the temple or the frame and including an antenna system housed in at least one of the temple or the frame and connected to others of the onboard electronics to provide wireless cellular connectivity to the eyewear device, the antenna system comprising:
a first one of a loop electrical conductor or a non-loop electrical conductor formed by the frame;
a second one of a loop electrical conductor or a non-loop electrical conductor carried by the temple; and
a transceiver connected in common to the loop electrical conductor and the non-loop electrical conductor to receive electrical signals through both the loop electrical conductor and the non-loop electrical conductor;
wherein if the first one of the loop electrical conductor or the non-loop electrical conductor formed by the frame comprises the loop electrical conductor and the second one of the loop electrical conductor or the non-loop electrical conductor carried by the temple comprises the loop electrical conductor.

16. The eyewear device of claim 15, wherein the frame is configured to hold a first lens of the one or more lenses in a lens area, and wherein the first one of the loop electrical conductor or the non-loop electrical conductor formed by the frame is disposed around at least a portion of a periphery of the first lens and is coupled the first lens such that the first lens acts as an antenna substrate for the first one of the loop electrical conductor or the non-loop electrical conductor.

17. The eyewear device of claim 15, wherein the second one of the loop electrical conductor or the non-loop electrical conductor carried by the temple is coupled to a speaker carrier of the temple.

* * * * *

UNITED STATES PATENT AND TRADEMARK OFFICE
CERTIFICATE OF CORRECTION

| | | |
|---|---|---|
| PATENT NO. | : 12,166,274 B2 | Page 1 of 1 |
| APPLICATION NO. | : 17/820719 | |
| DATED | : December 10, 2024 | |
| INVENTOR(S) | : Olgun et al. | |

It is certified that error appears in the above-identified patent and that said Letters Patent is hereby corrected as shown below:

On the Title Page

In item (57), in "Abstract", in Column 2, Line 4, delete "T" and insert --The-- therefor Signed and Sealed this
Eleventh Day of November, 2025

John A. Squires
*Director of the United States Patent and Trademark Office*